United States Patent
Arndt et al.

(10) Patent No.: US 7,227,473 B2
(45) Date of Patent: *Jun. 5, 2007

(54) THERMAL SENSOR

(75) Inventors: Michael Arndt, Reutlingen (DE);
Christian Krummel, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

This patent is subject to a terminal disclaimer.

(21) Appl. No.: 10/499,162

(22) PCT Filed: Sep. 20, 2002

(86) PCT No.: PCT/DE02/03542

§ 371 (c)(1),
(2), (4) Date: Oct. 14, 2004

(87) PCT Pub. No.: WO03/052365

PCT Pub. Date: Jun. 26, 2003

(65) Prior Publication Data
US 2005/0057362 A1    Mar. 17, 2005

(30) Foreign Application Priority Data
Dec. 15, 2001  (DE) .............................. 101 61 771

(51) Int. Cl.
    *G08B 17/00*  (2006.01)
(52) U.S. Cl. ..................... 340/584; 340/580; 374/163
(58) Field of Classification Search ................ 340/584,
                        340/580, 581; 73/295; 374/15, 163, 164
    See application file for complete search history.

(56) References Cited

U.S. PATENT DOCUMENTS

| | | | |
|---|---|---|---|
| 3,408,477 A | | 10/1968 | Kolster |
| 4,980,673 A | * | 12/1990 | Kleven .................. 340/581 |
| 5,003,295 A | | 3/1991 | Kleven |
| 5,143,325 A | | 9/1992 | Zieve et al. |
| 5,709,470 A | * | 1/1998 | Finley ..................... 374/16 |
| 5,790,026 A | * | 8/1998 | Lardiere et al. ........... 340/581 |
| 6,052,056 A | * | 4/2000 | Burns et al. .............. 340/583 |
| 6,060,991 A | * | 5/2000 | Hsieh ..................... 340/632 |
| 6,456,200 B1 | * | 9/2002 | Bostrom et al. ........... 340/580 |
| 6,776,037 B2 | * | 8/2004 | Maatuk ..................... 73/295 |

FOREIGN PATENT DOCUMENTS

| DE | 195 04 353 | 9/1995 |
|---|---|---|
| DE | 100 57 258 | 3/2002 |

* cited by examiner

*Primary Examiner*—John Tweel, Jr.
(74) *Attorney, Agent, or Firm*—Kenyon & Kenyon LLP

(57) ABSTRACT

A thermal sensor is provided, which is distinguished in that it includes means for removing a deposit on a sensing element of the sensor. In addition, means for detecting the deposit may be provided. The means for removing the deposit are realized by a trigger circuit for the sensing element, which brings about heating of the sensing element. In addition, a reference sensing element may be utilized as well, which is used both for indirect heating and for checking the sensing element. Due to the use of a catalytic layer on the sensing element, a deposit may be removed at relatively low temperatures.

8 Claims, 3 Drawing Sheets

THERMAL SENSOR

This application is the U.S. national phase of international application PCT/DE02/03542, filed on 20 Sep. 2002; which claims priority to German Application No. 101 61 771.2, filed 15 Dec. 2001.

FIELD OF THE INVENTION

The present invention relates to a thermal sensor.

BACKGROUND INFORMATION

A thermal sensor, which is used to detect a side impact, is described in German patent application DE 100 57 258. In this sensor, the adiabatic temperature increase that goes hand in hand with deformation of the side panel in a side impact is measured in order to thereby detect the side impact very quickly.

U.S. Pat. No. 5,003,295 describes an ice detector probe having a sensor element and a thermal means for removing a deposit from the sensing element. In addition, the sensor has an evaluation circuit, which is situated in a housing and is used to analyze an output signal of the sensor.

SUMMARY

An example thermal sensor according to the present invention may have the advantage that the thermal sensor includes an arrangement to remove a deposit from the sensing element utilized to record the temperature. In this way, it is possible to remove water, ice or other organic deposits from sensing elements, which are generally resistors on a temperature-insulated membrane. This has the advantage of achieving higher operational reliability since an impairment of the impact sensor system due to a deposit on the sensing element may not only be detected but the deposit also removed.

It may be particularly advantageous if the thermal sensor also includes an arrangement for detecting the deposit. The use of the arrangement for removing the deposit will thus be required only when warranted by the particular situation. If the arrangement for deposit detection were not available, the arrangement for deposit removal would have to be used repeatedly at certain intervals.

The arrangement for removing a deposit may advantageously include a trigger circuit for the sensing element, which brings about heating of the sensing element. Water, for instance, is removed by heating in this manner. Other deposits dissolved in the water are evaporated in this way as well.

Moreover, it is especially advantageous if the thermal sensor includes a reference sensing element, which is triggered by the trigger circuit in parallel with the sensing element, the evaluation circuit determining the deposit on the sensing element from a comparison of the first output signal of the sensing element with a second output signal of the reference sensing element. Due to the fact that the trigger circuit sends a periodic signal to the reference sensing element as well as the sensing element, a deposit on the sensing element is able to be detected by a signal comparison with respect to amplitude and phase. To this end, the reference sensing element should be shielded from the environment so that no deposits are able to form thereon. As an alternative, the signal sent to the sensing element may be compared to the output signal of the sensing element so as to ascertain the transmission function of the sensing element. Here, too, deposit detection is possible by an amplitude and phase comparison. A detailed analysis of the transmission function makes it possible to determine the type of deposit as well. As an alternative, the sensor element may be triggered by a heating signal at a time when no deposits are acting on the sensor element. Such a time may occur during final calibration, for instance. The output signal thus obtained may then be used as reference signal for this sensor element, so that no additional reference sensing element will be required. As described earlier, an amplitude and phase comparison between the reference signal and an output signal measured at any point in time is performed to detect a deposit. Alternatively, it is also possible to calculate the transmission function and utilize it for deposit detection.

Furthermore, it may be advantageous if the evaluation circuit detects the deposit from a cooling of the sensing element, the trigger circuit first having heated the sensing element. In the sense of a step function, it is therefore possible for the sensing element to utilize the response to this step function to detect the deposit on the sensing element. Step response is to be understood here as heating in the form of a step in order to then analyze the cooling as response characteristic. For instance, a typical value drop to the reciprocal value of the Euler number, which is a typical value for such evaluations, may be detected here.

Finally, it may also be advantageous if the sensing element itself has a catalytic layer, such layer effecting a removal of the deposit by heating. This catalytic layer may be made of a noble metal (rhodium, platinum or palladium). Especially a pyrolytic cleaning of the membrane may be performed in the process, thereby cleaning the thermal sensor of organic deposits, in particular. The temperature required to start pyrolytic cleaning may be generated by heating of the membrane with the aid of the resistors affixed on the membrane.

BRIEF DESCRIPTION OF THE DRAWINGS

Exemplary embodiments of the present invention are shown in the figures and explained in greater detail in the following description.

BACKGROUND INFORMATION

Thermal sensors are utilized in automotive technology to an increasing extent. As discussed earlier, such thermal sensors may also be employed for side-impact sensing. Owing to their use in motor vehicles, the thermal sensors are exposed to greatly fluctuating weather influences. Given such weather conditions, it is possible, in particular, that the thermal sensor, which must be in contact with its environment, has a deposit of liquid, i.e., water. This may be the result of bedewing, icing or contamination of the sensor.

The present invention provides a thermal sensor which includes an arrangement for removal of such deposits. In further developments, the thermal sensor is equipped with an arrangement for detection of the deposits and, lastly, also includes a catalytic layer, which is provided on the sensing element of the thermal sensor so as to remove the deposit by heating.

A thermal sensor has a sensing element to detect the temperature and an evaluation circuit for an output signal of the sensing element. In general, the sensing element is realized by metal-film resistors on a thermally insulating membrane. The evaluation circuit senses the signals from the sensing element, which are amplified and digitized by the evaluation circuit. They may then be transmitted to a control unit. The arrangement for removing the deposit from the sensing element is typically realized by heating. This may be generated by heating of the sensing element itself or by indirect heating. The catalytic layer may further improve this deposit removal via heating.

Figure 1:
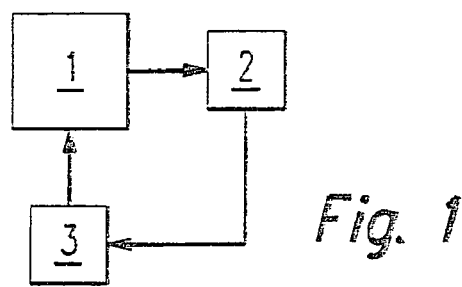
FIG. 1 shows a block diagram of the thermal sensor according to the present invention.

FIG. 1 shows the thermal sensor in the form of a block diagram. A sensing element 1 is connected to an evaluation circuit 2. As described above, evaluation circuit 2 has a measuring amplifier, an analog-digital converter and signal processing. Signal processing is normally realized by a processor or an ASIC. A trigger circuit 3, which triggers sensing element 1 and is itself triggered by evaluation circuit 2, establishes a closed-loop control circuit. Sensing element 1 is able to be triggered here by trigger circuit 3 as a function of the evaluated signals. To this end, trigger circuit 3 includes current sources and possibly a power amplifier.

Figure 2:
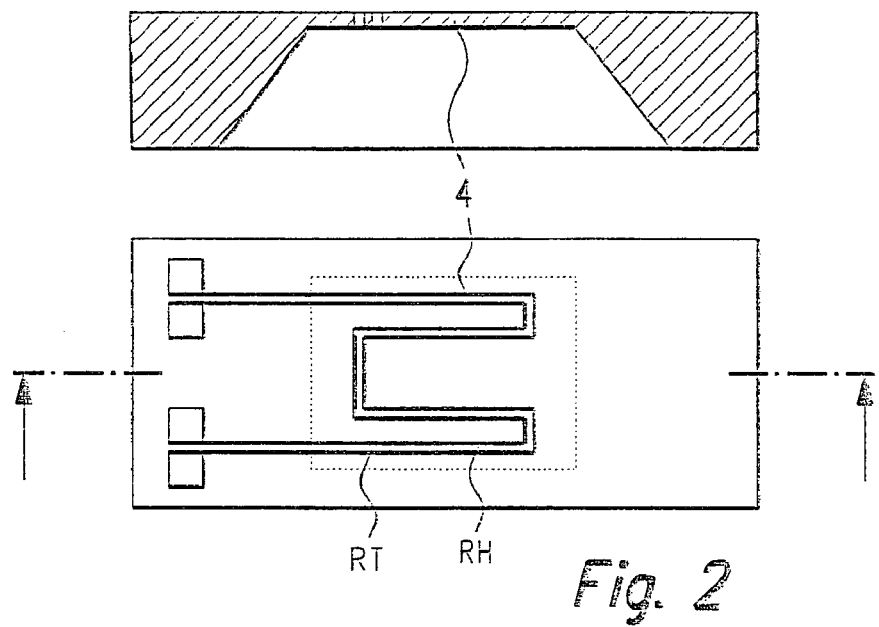
FIG. 2 shows an exemplary embodiment of the thermal sensor as micromechanical sensor.

FIG. 2 shows a realization of the sensing element. Metal-film resistors RT and RH are situated on a membrane 4. FIG. 2 shows a plan view and a section through the center of the structure. Membrane 4 has been produced by etching of a substrate, preferably a semi-conducting substrate. Metal-film resistors RT and RH have been deposited on the membrane using deposition technologies such as vapor deposition or electrode deposition. Platinum is usually used as material for the metal film. Resistors RT and RH form a small meander structure and are electrically separated from one another. However, they are arranged close enough to each other to allow indirect heating. Resistor RT is used to measure the temperature increase during use as side-impact sensor. Using evaluation circuit 2, its resistance value is measured and a resistance-proportional signal UDT is generated. With the aid of second resistor RH, which is thermally coupled to first resistor RT, a temperature signal may be simulated. Trigger circuit 3, which triggers RH with the aid of a heating voltage UH or a heating current IH, is required for this purpose.

Figure 3:
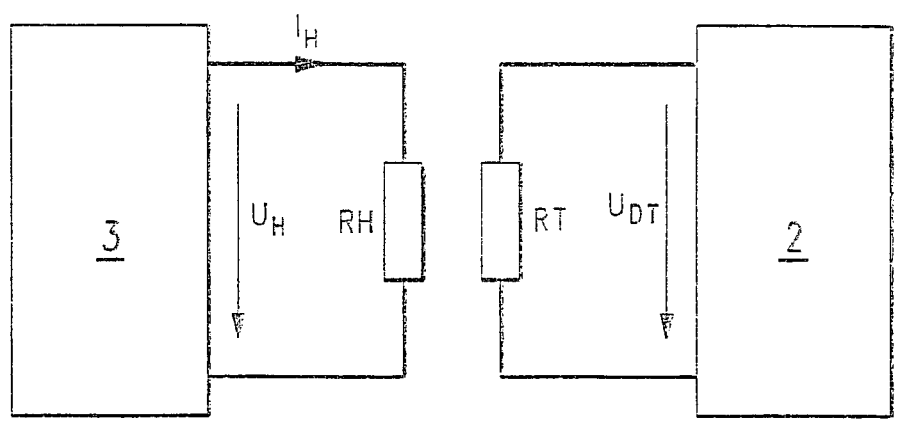
FIG. 3 shows a substitute circuit diagram of the thermal sensor.

FIG. 3 shows the situation just described in the form of a simple substitute circuit diagram. Resistor RH is connected to trigger circuit 3 and is heated thereby via a current IH or a voltage UH. Voltage UDT, which is measured by evaluation circuit 2, is tapped above resistor RT.

Figure 4:
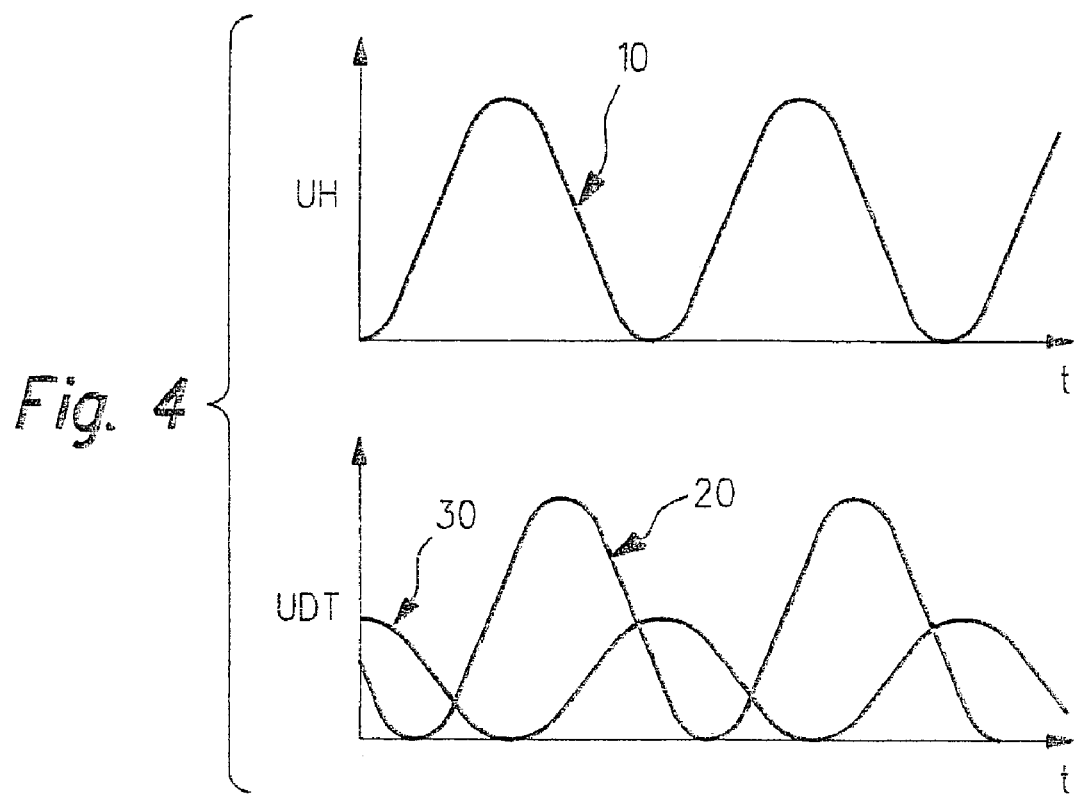
FIG. 4 shows a comparison of an input and an output signal of the sensor according to the present invention.

FIG. 4 shows the signal characteristic of the signals just described in the form of a diagram. The upper diagram describes voltage UH. This is voltage UH, which is used to heat resistor RH, a sinusoidal voltage 10 being utilized in this case. In the lower voltage timing diagram in which the time is plotted on the abscissa and the voltage on the ordinate, voltage UDT is shown on the ordinate, the voltage being measured by evaluation circuit 2.

If resistor RH is triggered by the temporally variable signal UH 10, periodic heating and cooling of resistors RH and RT will result. This heating and cooling is measured with the aid of evaluation circuit 2, and a temperature-dependent output signal UDT is generated. For a known trigger signal, a signal with a defined amplitude and a defined phase shift will always come about with an uncontaminated and undamaged sensor element. This is indicated by reference numeral 20 in the lower diagram. If a sensor element has dewing, icing or contamination, a changed phase shift and/or a changed amplitude will result for output signal UDT due to the increased mass and heat dissipation of the resistors, so that signal 30 will be generated. A measurement of these parameters thus allows a deposit to be detected. In FIG. 4, the method is shown with a sinusoidal signal; however, other signal shapes, such as a rectangle or saw-tooth, may basically be used as well.

Figure 5:
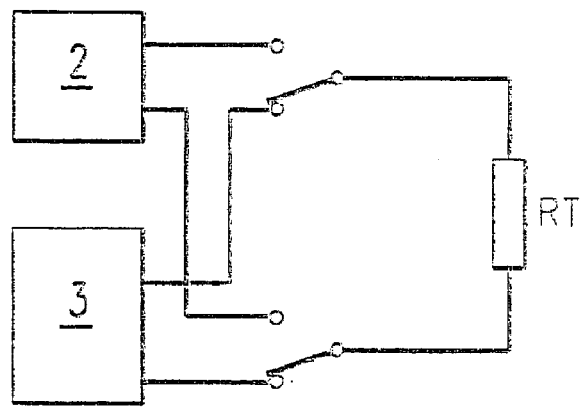
FIG. 5 shows a second substitute circuit diagram of the thermal sensor.

The measuring principle according to the present invention may also be applied to sensing elements in which heating resistor element RH has been omitted. This is shown in FIG. 5. Here, only resistor RT is present. During measurements, this resistor RT is used both for heating and for the measurement. To this end, resistor RT is first coupled to trigger circuit 3. After heating, the resistor is decoupled from trigger circuit 3 and connected to evaluation circuit 2. Signal UDT therefore represents the cooling process of the sensing element. The cooling process of a sensor element without deposits is of very brief duration, approximately 0.1 to 50 ms; in contrast, the cooling process of a sensing element with deposits is much slower since the thermally relevant mass is greater. If the time is measured for switching off the heating until resistor RT reaches a specific temperature, i.e., a voltage value UTDT, a time delay δT, which is able to be measured, results for a sensing element that includes a deposit.

Figure 6:
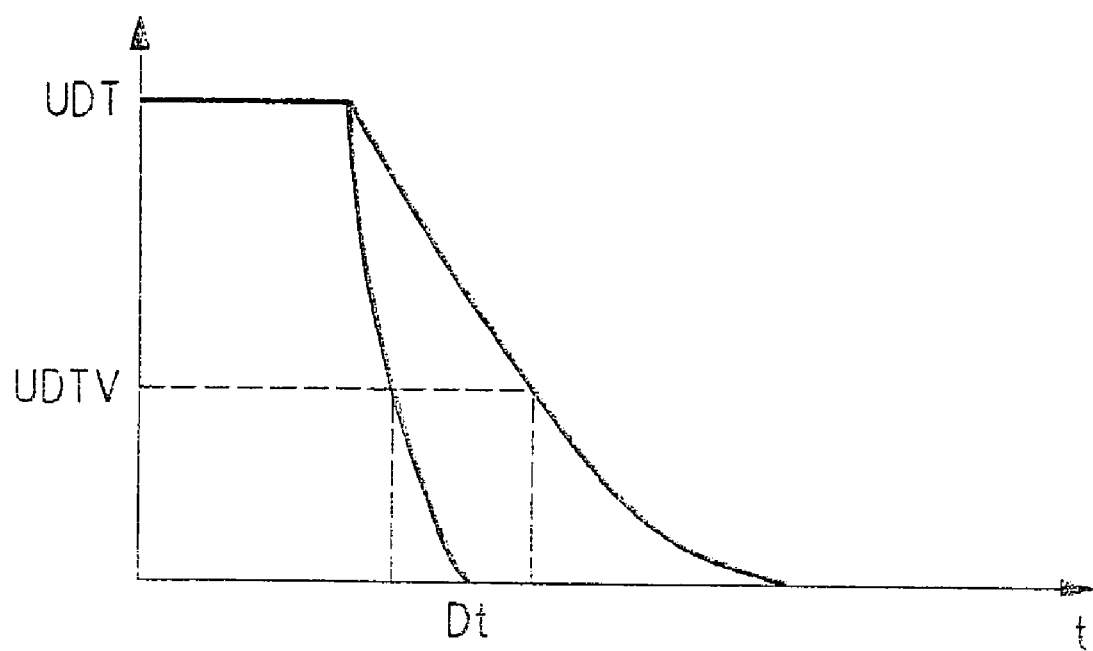
FIG. 6 shows a cooling process of the thermal sensor with and without deposits.

FIG. 6 shows this characteristic in a voltage timing diagram. Two curves representing different decay times for the cooling of resistor RDT, are depicted here. The decay curve on the right shows the cooling of a contaminated resistor, i.e., the time is longer than that for a non-contaminated sensor. This characteristic is illustrated by the left curve, which exhibits a steeper drop, i.e., cooling. The switchover between evaluation circuit 2 and trigger circuit 3 may be implemented electronically or electromechanically.

Icing or dewing of the thermal sensor may be avoided or removed by heating the sensor. If resistors RT and RH are present, RH may be utilized for the heating. Heating may be performed with the aid of trigger circuit 3 without switching.

If only resistor RT is present, it must be decoupled from evaluation circuit 2 for the heating process and be coupled to trigger circuit 3.

Heating may be carried out slowly or in a pulse. In slow heating, the entire volume of the ice or water film will evaporate. In pulse-type heating, a film evaporation may be brought about which results in the ice or fluid layer sliding off.

By using a catalytic layer in the area of membrane 4, a pyrolytic cleaning of membrane 4 may be implemented at already relatively low temperatures. This makes it possible to remove organic deposits from the sensor. The temperature required for starting the pyrolytic cleaning may be generated by heating membrane 4 with the aid of resistors RT and RH.

What is claimed is:

1. A thermal sensor, comprising:
   a sensing element to detect a temperature;
   an evaluation circuit to analyze an output signal of the sensing element;
   an arrangement configured to remove a deposit from the sensing element; and
   a reference sensing element which is triggered by a trigger circuit in parallel with the sensing element;
   wherein the evaluation circuit is configured to determine the deposit on the sensing element from a comparison of a first output signal of the sensing element with a second output signal of the reference sensing element.

2. The thermal sensor as recited in claim 1, further comprising:

an arrangement configured to detect the deposit.

3. The thermal sensor as recited in claim 1, wherein the arrangement configured to remove the deposit includes the trigger circuit, the trigger circuit effecting heating of the sensing element.

4. The thermal sensor as recited in claim 1, wherein the trigger circuit triggers the reference sensing element and the sensing element using a periodic signal.

5. The thermal sensor as recited in claim 1, wherein the evaluation circuit detects the deposit from a cooling of the sensing element, the trigger circuit first having effected a heating of the sensing element.

6. The thermal sensor as recited in claim 1, wherein the arrangement configured to remove the deposit includes a catalytic layer on the sensing element, which effects the removal of the deposit by heating.

7. The thermal sensor as recited in claim 6, wherein the catalytic layer is formed from noble metal.

8. The thermal sensor as recited in claim 6, wherein the catalytic layer is formed from one of rhodium, platinum or palladium.

* * * * *